United States Patent
Showa et al.

(10) Patent No.: US 11,682,431 B2
(45) Date of Patent: Jun. 20, 2023

(54) BASE MEMBER, SPINDLE MOTOR, AND HARD DISK DRIVE DEVICE

(71) Applicant: MINEBEA MITSUMI Inc., Nagano (JP)

(72) Inventors: Hideaki Showa, Nagano (JP); Kazuo Sato, Nagano (JP); Junichi Nakane, Nagano (JP)

(73) Assignee: MINEBEA MITSUMI Inc., Nagano (JP)

( * ) Notice: Subject to any disclaimer, the term of this patent is extended or adjusted under 35 U.S.C. 154(b) by 0 days.

(21) Appl. No.: 17/403,021

(22) Filed: Aug. 16, 2021

(65) Prior Publication Data

US 2022/0068305 A1 Mar. 3, 2022

(30) Foreign Application Priority Data

Aug. 27, 2020 (JP) .............................. JP2020-143256

(51) Int. Cl.
*G11B 33/14* (2006.01)
*G11B 25/04* (2006.01)

(52) U.S. Cl.
CPC ........ *G11B 33/1446* (2013.01); *G11B 25/043* (2013.01); *G11B 33/148* (2013.01)

(58) Field of Classification Search
None
See application file for complete search history.

(56) References Cited

U.S. PATENT DOCUMENTS

| | | | |
|---|---|---|---|
| 7,914,858 B1* | 3/2011 | deJesus | G11B 33/148 427/407.1 |
| 8,248,724 B2* | 8/2012 | Hayakawa | G11B 33/1486 360/97.12 |
| 8,699,179 B1* | 4/2014 | Golgolab | G11B 33/1486 360/97.12 |
| 10,407,775 B2 | 9/2019 | Sakurada et al. | |
| 10,559,327 B2* | 2/2020 | Yoshimura | G11B 25/043 |
| 2008/0165448 A1* | 7/2008 | Ichikawa | G11B 25/043 29/603.03 |
| 2017/0236557 A1* | 8/2017 | Albrecht | G11B 33/1466 360/97.12 |
| 2019/0093234 A1* | 3/2019 | Sakurada | C23C 18/1803 |
| 2020/0185003 A1* | 6/2020 | Ino | G11B 33/121 |

FOREIGN PATENT DOCUMENTS

JP 2017075340 A * 4/2017
JP 2019-058017 A 4/2019

OTHER PUBLICATIONS

Machine Translation and Abstract Translation of JP 2017-075340 A. (Year: 2017).*

* cited by examiner

*Primary Examiner* — Kevin M Bernatz
(74) *Attorney, Agent, or Firm* — Pearne & Gordon LLP (57) ABSTRACT

A base member serves as a part of a housing of a hard disk drive device. The base member includes a base body being a cast product, a first machined surface obtained by machining a portion formed with a convex portion of the base body, and a coating film covering a surface of the base body. The base body includes a coated surface obtained by covering the first machined surface with the coating film, and a second machined portion obtained by machining a part of the base body other than the first machined surface.

17 Claims, 6 Drawing Sheets

BASE MEMBER, SPINDLE MOTOR, AND HARD DISK DRIVE DEVICE

CROSS REFERENCE TO RELATED APPLICATION

This application claims the benefit of priority to Japanese Patent Application Number 2020-143256 filed on Aug. 27, 2020. The entire contents of the above-identified application is hereby incorporated by reference.

BACKGROUND OF THE INVENTION

Technical Field

The present disclosure relates to a base member of an electronic device such as a hard disk drive device enclosed with low density gas such as helium gas, and particularly relates to a technique for suppressing leakage of the low density gas from the base member to the outside. Furthermore, the present desclosure relates to a spindle motor and a hard disk drive device using the base member described above.

Background Art

For a hard disk drive device, machining is performed after coating (for example, electrodeposition coating) on a surface of a base member being a die cast component to expose a metal surface from the coated surface, ensuring the required dimensional accuracy. In a case of a hard disk drive device filled with gas (for example, helium) having a density lower than that of air, when a casting cavity is exposed at the surface due to formation of the machined surface, there is concern that the low density gas inside the device may leak to the outside through the casting cavity. Japanese Unexmined Patent Application Publication No. 2019-58017 and U.S. Pat. No. 7,914,858 disclose a technique for closing a casting cavity by covering such a machined surface with an impregnating agent.

Incidentally, in die casting of the base member, when an inlet (gate) for injecting molten metal is provided at a portion of a die casting mold corresponding to a short side wall portion of the base member, injection pressure increases by reducing an area of the gate, and thus, a base member having high density and a small number of casting cavities can be obtained. Meanwhile, the high pressure of the molten metal makes it easier for erosion of the die casting mold around the gate to occur. When a die casting mold with progressive erosion is used, a convex portion corresponding to the erosion forms around the gate of the base member, resulting in a rough surface.

In some hard disk drive devices, a label having description of product manufacturing information and the like may be applied to the surface formed with the convex portion as described above. Although the label is applied with an adhesive, there is concern that when the convex portion is present at an application surface of the base member, the label will easily peel off over time after being applied.

Thus, it is conceivable that the convex portion formed at a position corresponding to the erosion be removed by machining and flattened. However, machining may expose internal casting cavities to the surface and lower sealing performance of the low density gas. Consequently, it is desirable to take measure to seal the casting cavities exposed at the surface. In the techniques disclosed in Patent Documents 1 and 2, after the electrodeposition coating is performed, a portion required to have high dimensional accuracy is machined. At this time, an impregnating agent such as epoxy resin is impregnated into the inside from the machined surface exposed from the electrodeposition coating.

However, in the impregnation process, after the base member is immersed in the impregnating agent, the impregnating agent covering the machined surface is removed by cleaning, so the surface of the final product is in a state of the machined surface being exposed. In this case, insufficient impregnation of the impregnating agent into the casting cavities may lead to the leakage of the low density gas.

SUMMARY OF THE INVENTION

The present disclosure is made in consideration of such a situation, and one or more aspects of the present disclosure are directed to a base member capable of suppressing leakage of low density gas from a portion formed by removing a convex portion of the base member caused by erosion of a die casting mold.

One aspect of the present disclosure is a method of manufacturing a base member serving as a part of a housing of a hard disk drive device. The method includes molding a base body by casting, first machining of machining a portion formed with a convex portion of the base body and forming a first machined surface, coating of forming a coating film at a surface including the first machined surface of the base body, and second machining of machining a part of a surface of the base body other than the first machined surface and forming a second machined portion.

According to the present disclosure, since the coating film is formed at the first machined surface, a casting cavity exposed at a surface of the first machined surface is sealed, and thus, leakage of low density gas inside the device can be suppressed. In addition, since the first machined surface is formed by removing the convex portion formed at a position corresponding to erosion of a die casting mold by the first machining, a label can be applied to the first machined surface formed with the coating film in a state of the label being difficult to peel off.

It is preferable that impregnation can be performed after the second machining. The impregnation is a process of immersing a material in an impregnating agent such as resin to impregnate the casting cavity exposed at the surface with the impregnating agent. By performing this process, the casting cavity exposed at the second machined portion can be sealed, a portion insufficiently formed with the coating film can be sealed, and the leakage of the low density gas inside the device can be more effectively suppressed.

Another aspect of the present disclosure relates to a base member serving as a part of a housing of a hard disk drive device. The base member includes a base body being a cast product, a first machined surface obtained by machining a portion formed with a convex portion of the base body, and a coating film covering a surface of the base body, wherein the base body includes a coated surface obtained by covering the first machined surface with the coating film, and a second machined portion obtained by machining a part of the base body other than the first machined surface. A label having description of product manufacturing information and the like can be applied to the first machined surface.

It is preferable that the present disclosure is a spindle motor provided with the base member described above, and is also a hard disk drive device provided with such a spindle motor. Low density gas such as helium gas can be enclosed in the hard disk drive device.

According to the present disclosure, it is possible to provide the base member, the spindle motor, and the hard disk drive device capable of suppressing the leakage of the low density gas from the portion obtained by removing the convex portion of the base member caused by the erosion of the die casting mold.

DESCRIPTION OF THE PREFERRED EMBODIMENTS

1. Configuration of Base Member

Figure 1:
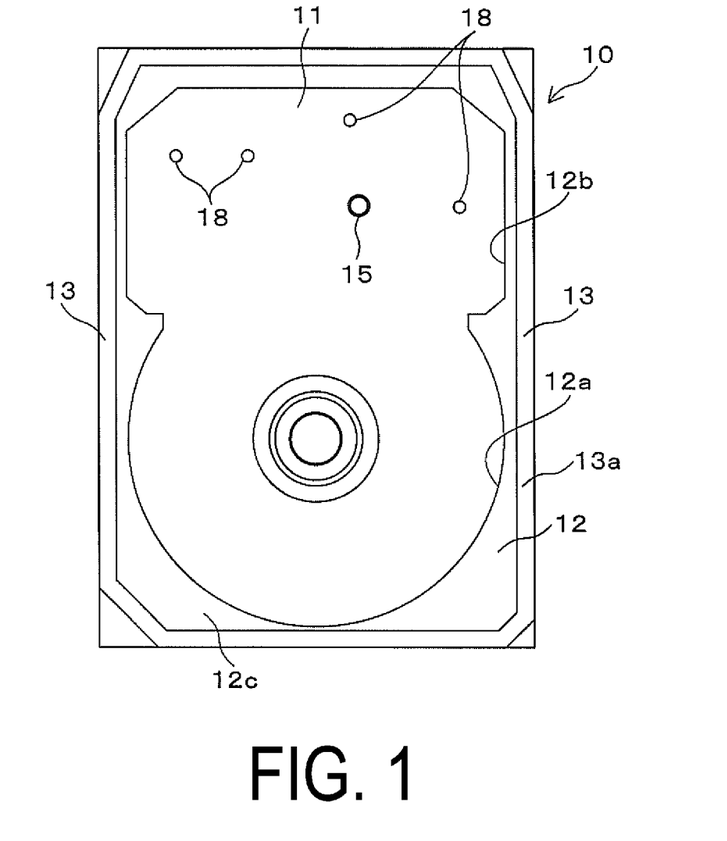
FIG. 1 is a plan view illustrating a base member according to an embodiment of the present disclosure.
Figure 2:
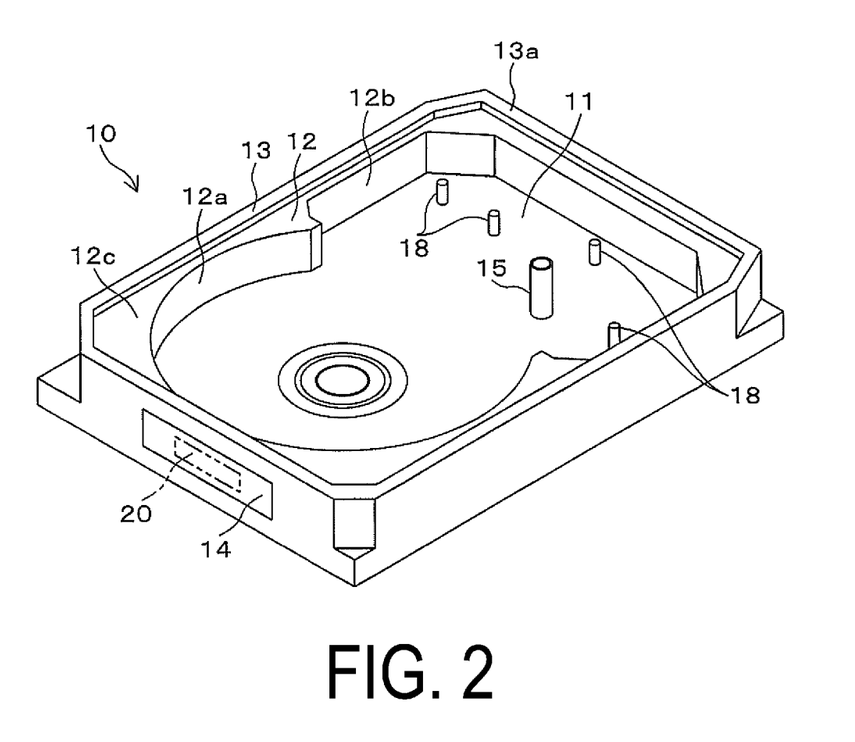
FIG. 2 is a perspective view illustrating a base member according to an embodiment of the present disclosure.
Figure 3:
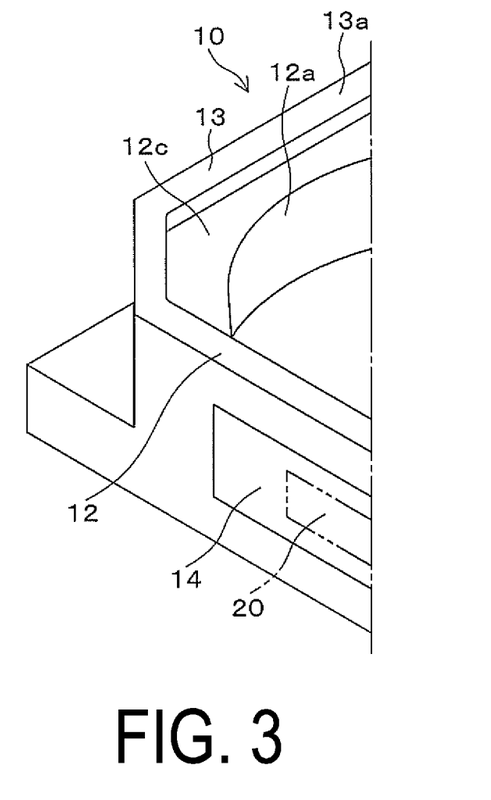
FIG. 3 is an enlarged perspective view illustrating a part of a base member according to an embodiment of the present disclosure.

An embodiment of a base member according to the present disclosure will be described with reference to FIGS. 1 to 3. In the figures, a reference sign 10 indicates the base member according to an embodiment, and the base member 10 is manufactured by die casting of aluminum. A reference sign 11 indicates a bottom portion, and the bottom portion 11 has a rectangular plate shape having short sides and long sides. A side wall portion 12 extending in a direction orthogonal to the bottom portion 11 is formed at an entire periphery of the bottom portion 11.

The side wall portion 12 includes a circular portion 12a having an inner peripheral surface shape formed along a shape of a hard disk, and a rectangular portion 12b having a rectangular shape and configured to accommodate a mechanism for writing and reading data to and from the hard disk. In addition, a flat first machined surface 14 with an aluminum base exposed in a wider area than that of a first gate 20 is formed at a portion corresponding to the first gate 20 being an outer wall portion at a side of a short side of the side wall portion 12 and being an inlet for molten metal of a die casting mold. Note that a convex portion formed by erosion of the die casting mold may be formed at a position separated from the first gate 20. In such a case, the first machined surface 14 is formed at a position partially overlapping the first gate 20, or is formed at a position adjacent to the first gate 20 without overlapping.

A rib portion 13 being flatly continuous with the outer surface portion of the side wall portion 12 is formed at an upper surface 12c of the side wall portion 12. A thickness of the rib portion 13 is set to be smaller than a thickness of the side wall portion 12. Note that in the figures, a reference sign 15 indicates a shaft to be used when the base member 10 is used in the hard disk drive device, and a reference sign 18 indicates a columnar support for fixing a data reading/writing mechanism of the hard disk drive device. These shaft 15 and columnar supports 18 are casted by die casting integrally with the base member 10.

The base member 10 has been subjected to electrodeposition coating. Note that the coating method is not limited to the electrodeposition coating, and may be powder coating, spray coating, brush coating, or plating coating such as electroless nickel plating. The first machined surface 14 is covered with an electrodeposition coating film by the electrodeposition coating. Additionally, a second machined portion with an aluminum base exposed is formed at a position required to have high accuracy. The position required to have high accuracy is, for example, an upper surface 13a of the rib portion 13. Note that portions other than the second machined portion are covered by an electrodeposition coating film.

In the base member 10 having the configuration described above, the first machined surface 14 is covered with the electrodeposition coating film, and thus, a casting cavity exposed at the surface is sealed, and leakage of low density gas such as helium gas from the first machined surface 14 can be suppressed. In addition, since the first machined surface 14 is formed by removing the convex portion formed at a position corresponding to the erosion of the die casting mold, a label having description of product manufacturing information and the like can be applied to the first machined surface 14 formed with the electrodeposition coating film in a state of the label being difficult to peel off.

2. Method of Manufacturing Base Member

Figure 6:
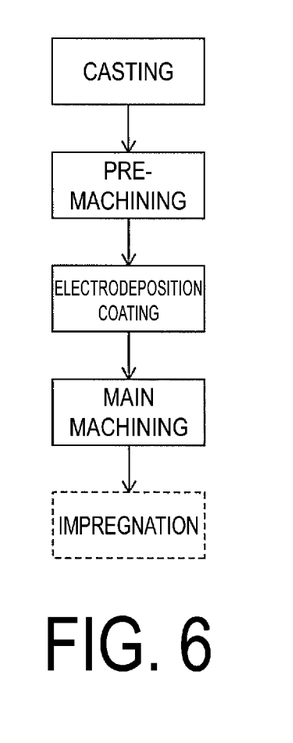
FIG. 6 is a flowchart illustrating a method of manufacturing a base member according to an embodiment of the present disclosure.

Next, a method of manufacturing the base member 10 described above will be described with reference to FIG. 6. FIG. 6 is a flowchart illustrating the method of manufacturing the base member 10.

(Casting)

Molten metal of aluminum is injected into a die casting mold having a cavity having the same shape and size as those of the base member 10. In this case, the first gate 20 serving as the inlet of the molten metal is provided at the side of the short side of the base member 10. When the molten metal cools and solidifies in the cavity, the die casting mold is opened, the base member 10 is removed, and a remaining and solidified portion in a runner leading to the first gate 20 is cut.

(Pre-Machining)

The convex portion formed by the erosion around the first gate 20 of the die casting mold is removed by machining by cutting using an end mill or the like or grinding using a grinder or the like. This forms the flat first machined surface 14 in a wider area than that of the first gate 20.

(Electrodeposition Coating)

The base member 10 is immersed in liquid obtained by dissolving, for example, water-soluble epoxy-based resin, and the resin is dried and thermally cured after the resin is adhered to the base member 10 by applying an electric current. By this electrodeposition coating, the entire surface of the base member 10 is covered with the resin, and the casting cavity exposed at the surface is sealed.

(Main Machining)

Machining is performed by cutting using an end mill or the like or grinding using a grinder or the like on a position required to have high accuracy to expose the aluminum base of the base member 10. By this machining, the second machined portion having predetermined dimensional accuracy and surface roughness is formed.

(Impregnation)

The base member 10 is immersed in an impregnating agent such as epoxy-based resin, and the impregnating agent is impregnated into the casting cavity exposed at the surface of the second machined portion. The base member 10 is then cleaned to remove the impregnating agent attached to the entire surface of the base member 10. Although the impregnation is not necessary in the present disclosure, by sealing the casting cavity exposed at the second machined portion, the leakage of the low density gas from the second machined portion is suppressed, and thus the impregnation can be employed as necessary.

3. Spindle Motor

Figure 4:
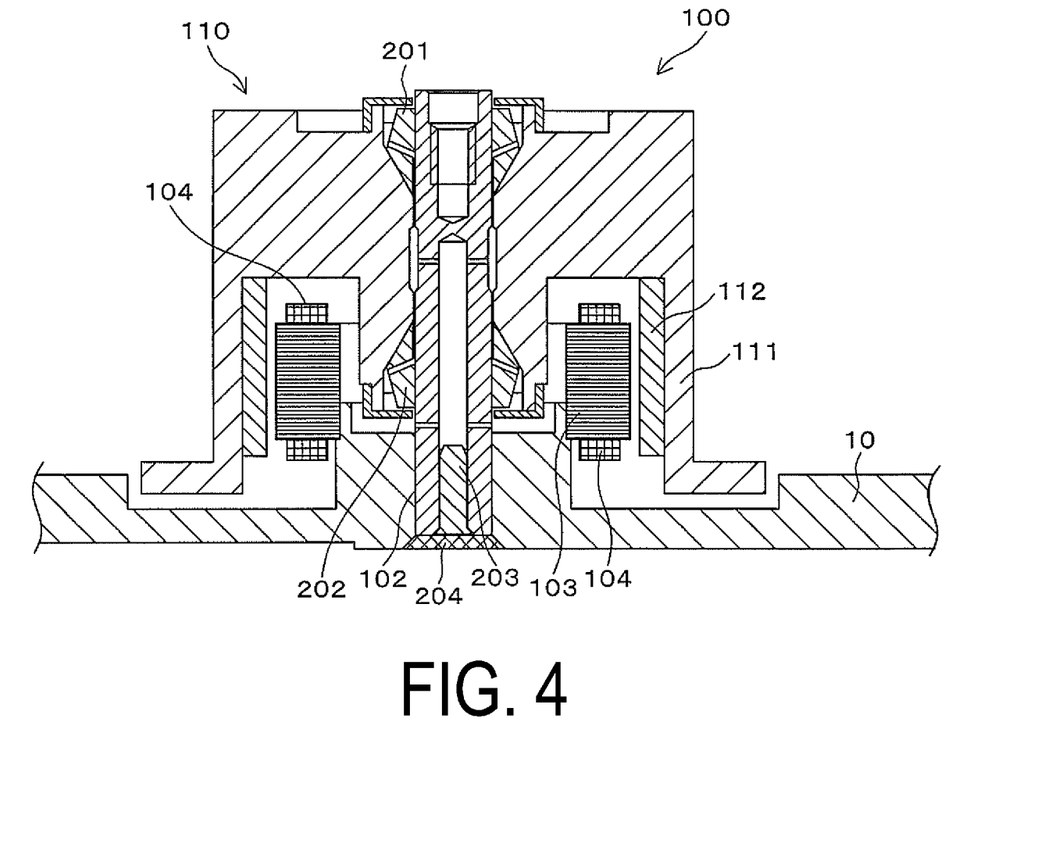
FIG. 4 is a cross-sectional view illustrating a spindle motor according to an embodiment of the present disclosure.

FIG. 4 is a cross-sectional view illustrating a spindle motor 100 using the base member 10 described above, according to an embodiment of the present disclosure. A shaft 102 made of metal and having a cylindrical shape is fixed to the base member 10 by a method of press fitting or the like. Also, a stator core 103 is fixed to the base member 10. The stator core 103 is formed by laminating a plurality of soft magnetic materials (for example, electromagnetic steel sheets) having a thin plate shape in an axial direction, and includes a plurality of pole teeth having an annular shape and protruding outward in a radial direction. The plurality of pole teeth are provided at equal intervals along a circumferential direction, and a coil 104 is wound around each pole teeth.

Bearing members 201 and 202 having a conical shape are fixed to the shaft 102, and a rotor 110 is rotatably supported on the bearing members 201 and 202. The rotor 110 includes an outer cylindrical portion 111, and a rotor magnet 112 having an annular shape is fixed to an inner circumferential surface of the outer cylindrical portion 111. The rotor magnet 112 is magnetized such that adjacent portions alternately have opposite polarities such as SNSN along the circumferential direction. An inner circumference of the rotor magnet 112 faces an outer circumference of the pole teeth of the stator core 103 across a gap. By applying a driving current to the coil 104, the rotor 110 rotates with respect to the shaft 102 and the stator core 103 fixed to the base member 10.

Additionally, a lower end hollow portion of the shaft 102 is inserted with a sealing member 203, such as a pin, and the sealing member 203 is fixed in the shaft 102 by a fixing member 204, such as an adhesive. The sealing member 203 and the fixing member 204 prevent the leakage of the low density gas inside from the shaft 102.

In the spindle motor 100 having the configuration described above, the leakage of the low density gas from the first machined surface 14 of the base member 10 is suppressed, so when the base member 10 is sealed with the cover and the low density gas such as helium gas is enclosed inside, the leakage of the low density gas can be suppressed.

4. Hard Disk Drive Device

Figure 5A:
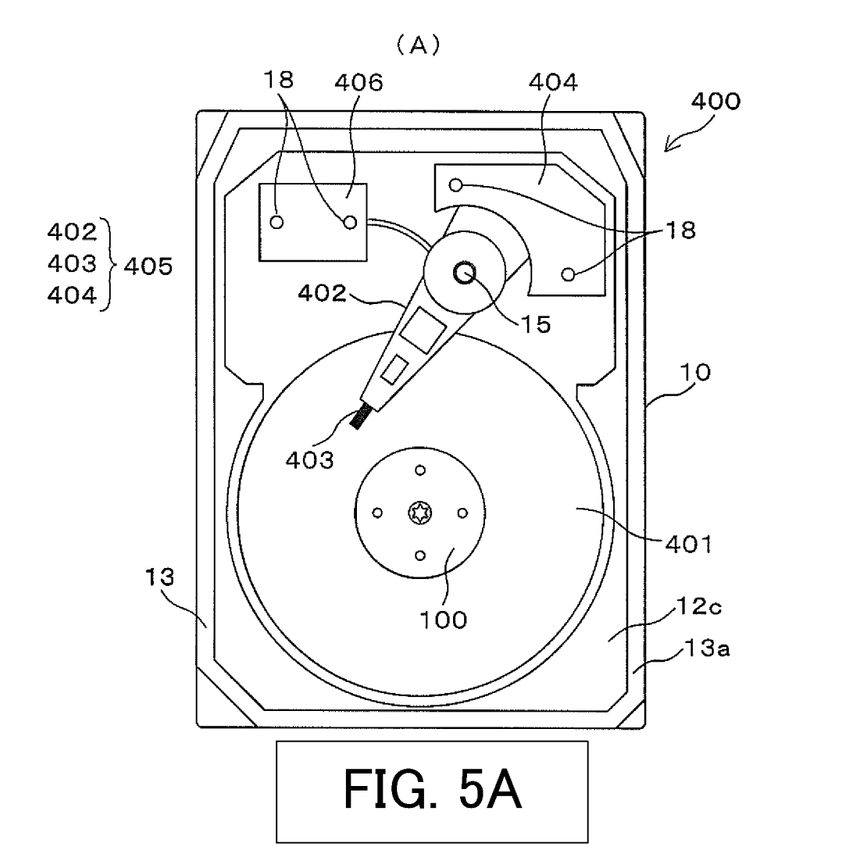
FIG. 5A illustrates a plan view with a cover removed of a hard disk drive device according to an embodiment of the present disclosure.
Figure 5B:
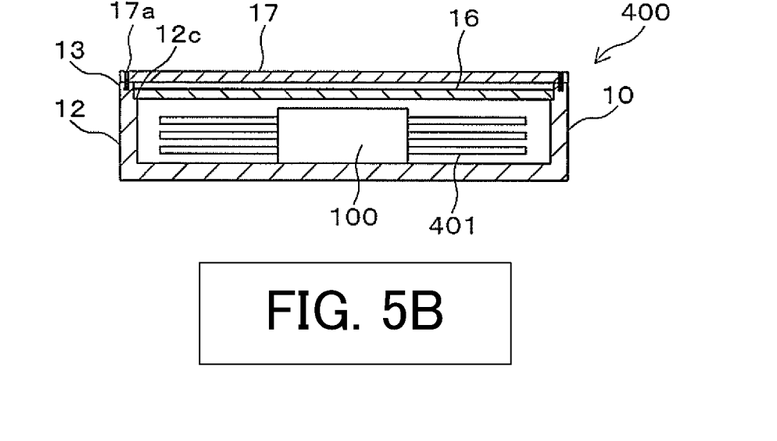
FIG. 5B illustrates a cross sectional view of a hard disk drive devie according to an emodiment of the present disclosure.

FIG. 5A and FIG. 5B illustrate a hard disk drive device 400 using the spindle motor 100, according to an embodiment of the present disclosure. A plurality of hard disks 401 are attached to the spindle motor 100 at a distance from each other. A swing arm 402 is rotatably supported on the shaft 15 of the base member 10.

A tip portion of the swing arm 402 is attached with a magnetic head 403. Also, the swing arm 402 is swung by a driving mechanism 404. The driving mechanism 404 is attached to the columnar supports 18. Such a swing arm 402 is provided for each of the hard disks 401. A reading/writing mechanism 405 is configured to write and read data to and from the hard disks 401 by the swing arm 402, the magnetic head 403, and the driving mechanism 404. Note that a reference sign 406 indicates a circuit board configured to control the reading/writing mechanism 405, and the circuit board 406 is attached to the columnar supports 18.

As illustrated in FIG. 5B, an inner cover 16 is attached to the upper surface 12c of the side wall portion 12 of the base member 10 by screws or the like in a helium gas environment. A sealing material (not illustrated) such as a gasket is provided between the inner cover 16 and the upper surface 12c of the side wall portion 12. Additionally, an outer cover 17 is fixed to the upper surface 13a of the rib portion 13 of the base member 10. The outer cover 17 is welded to the entire periphery of the rib portion 13 by a method such as laser welding, as illustrated as a welding bead 17a. As a result, the hard disk drive device 400 has a dual sealing structure by the inner cover 16 and the outer cover 17, and leakage of helium gas sealed inside is effectively prevented.

A label having description of product manufacturing information and the like is applied to the first machined surface 14 covered by the electrodeposition coating film. An adhesive layer is provided at the label. The first machined surface 14 is a flat surface obtained by removing the convex portion formed by the erosion of the die casting mold, so the label is applied in a state of being difficult to peel off.

In the hard disk drive device 400 having the configuration described above, the hard disk 401 is rotated by the spindle motor 100, and writing and reading of data are performed by the magnetic head 403 to and from the hard disk 401. In the hard disk drive device 400 having the configuration described above, the leakage of the helium gas from the first machined surface 14 of the base member 10 is suppressed, so the leakage of the helium gas from the inside can be suppressed.

In the embodiment described above, helium gas is enclosed inside the hard disk drive device 400, but another gas having a smaller density than that of air can be enclosed. Alternatively, by attaching the inner cover 16 to the base member 10 under reduced pressure, gas having a smaller specific gravity than that of air at normal pressure can be used as the internal gas.

The present disclosure can be used for an electronic device such as a spindle motor or a hard disk drive device, and a base member to be used in the same.

While preferred embodiments of the invention have been described as above, it is to be understood that variations and modifications will be apparent to those skilled in the art without departing from the scope and spirit of the invention. The scope of the invention, therefore, is to be determined solely by the following claims.

What is claimed is:

1. A base member serving as a part of a housing of a hard disk drive device, the base member comprising:
   a base body being a cast product;
   a casting surface formed on the base body;
   a first machined surface formed in the casting surface at a position close to a gate portion corresponding to a gate of a die casting mold; and
   a coating film directly covering a surface of the base body, wherein
   the coating film covers the first machined surface, and
   a second machined portion is formed in the casting surface in a position other than the first machined surface,
      wherein the second machined portion is subject to machining to remove the coating film, and the second machined portion is impregnated with an impregnating agent.

2. The base member according to claim 1, wherein first machined surface is machined in a convex portion of the base body;

the coating film at-directly covers a-the surface of the base body including the first machined surface; and the second machined portion is formed in the surface of the base body in a position other than the first machined surface.

3. The base member according to claim 2, wherein a casting cavity exposed at the second machined portion is impregnated with the impregnating agent.

4. A spindle motor comprising: the base member according to claim 1.

5. A hard disk drive device comprising: the spindle motor according to claim 4, wherein a label having an adhesive layer is applied to the first machined surface.

6. The base member according to claim 1, wherein the coating film is an electrodeposition coating film.

7. The base member according to claim 1, wherein the coating film is epoxy resin.

8. The base member according to claim 1, wherein the first machined surface is flat.

9. The base member according to claim 1, wherein the base body has a casting cavity exposed at the second machined portion.

10. A base member serving as a part of a housing of a hard disk drive device, the base member comprising:
- a base body being a cast product and having a pair of short side wall portions and a pair of long side wall portions;
- a casting surface formed on the base body;
- a first machined surface at the short side wall portion; and
- a coating film directly covering a surface of the base body, wherein
- a coating film covers the first machined surface, and
- a second machined portion is formed in the casting surface other than the first machined surface,
- wherein the second machined portion is subject to machining to remove the coating film, and the second machined potion is impregnated with an impregnating agent.

11. The base member according to claim 10, wherein the first machined surface is formed in the casting surface over a portion close to a gate portion corresponding to a gate of a die casting mold.

12. The base member according to claim 10, wherein the coating film is an electrodeposition coating film.

13. The base member according to claim 12, wherein the coating film is epoxy resin.

14. The base member according to claim 10, wherein the first machined surface is flat.

15. A spindle motor comprising: the base member according to claim 10.

16. A hard disk drive device comprising: the spindle motor according to claim 15, wherein a label having an adhesive layer is applied to the coated surface.

17. A base member according to claim 10, wherein the base body has a casting cavity exposed at the second machined portion.

* * * * *